(12) United States Patent
Bell et al.

(10) Patent No.: US 10,673,731 B2
(45) Date of Patent: *Jun. 2, 2020

(54) SYSTEM EVENT ANALYZER AND OUTLIER VISUALIZATION

(71) Applicant: Uber Technologies, Inc., San Francisco, CA (US)

(72) Inventors: Franziska Bell, San Francisco, CA (US); David Purdy, Millbrae, CA (US); Laszlo Korsos, San Francisco, CA (US); Shan He, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,610

(22) Filed: Mar. 26, 2019

(65) Prior Publication Data

US 2019/0222503 A1    Jul. 18, 2019

Related U.S. Application Data

(63) Continuation of application No. 14/847,656, filed on Sep. 8, 2015, now Pat. No. 10,284,453.

(51) Int. Cl.
*G06F 15/173* (2006.01)
*H04L 12/26* (2006.01)
*H04L 12/24* (2006.01)

(52) U.S. Cl.
CPC ............ *H04L 43/16* (2013.01); *H04L 41/064* (2013.01); *H04L 41/069* (2013.01); *H04L 41/0622* (2013.01)

(58) Field of Classification Search
CPC .......... G06Q 10/00; G06Q 10/10; H04L 67/02
See application file for complete search history.

(56) References Cited

U.S. PATENT DOCUMENTS 7,698,740 B2    4/2010  Oka et al.
7,716,022 B1 *  5/2010  Park .................. G06Q 10/10
                                                      702/181

(Continued)

OTHER PUBLICATIONS

Babcock, B. et al., "Models and Issues in Data Stream Systems," Proceedings of the 2002 ACM Symposium on Principles of Database Systems (PODS 2002),ACM Press, 2002, pp. 1-15.

(Continued)

*Primary Examiner* — Dustin Nguyen
(74) *Attorney, Agent, or Firm* — Fenwick & West LLP

(57) ABSTRACT

An event analysis system receives events in a time-series from a set of monitored systems and identifies a set of alert threshold values for each of the types of events to identify outliers in the time-series at an evaluated time. Portions of historic event data is selected to identify windows of event data near the evaluated time at a set of seasonally-adjusted times to predict the value of the event type. The alert threshold value may also account for a prediction based on recent, higher-frequency events. Using the alert threshold values for a plurality of event types, the event data is compared with the alert threshold values to determine an alert level for the data. The event data types are also clustered and displayed with the alert levels to provide a visualization of the event data and identify outliers when the new event data is received.

20 Claims, 5 Drawing Sheets

(56) References Cited

U.S. PATENT DOCUMENTS

| | | | |
|---|---|---|---|
| 7,783,510 B1* | 8/2010 | Gilgur | G06Q 10/00 |
| | | | 705/7.25 |
| 8,111,626 B2 | 2/2012 | Shaikh et al. | |
| 8,200,682 B2 | 6/2012 | Suntinger et al. | |
| 9,311,271 B2 | 4/2016 | Wright | |
| 9,367,809 B2 | 6/2016 | Puri et al. | |
| 9,483,729 B1 | 11/2016 | Allen et al. | |
| 9,596,254 B1 | 3/2017 | Muddu et al. | |
| 9,921,937 B2 | 3/2018 | Seto | |
| 10,042,697 B2* | 8/2018 | Ahad | H04L 67/02 |
| 2010/0031156 A1 | 2/2010 | Doyle et al. | |
| 2011/0010209 A1 | 1/2011 | McNally | |
| 2012/0075450 A1 | 3/2012 | Ding et al. | |
| 2012/0144335 A1 | 6/2012 | Abeln et al. | |
| 2013/0282331 A1 | 10/2013 | Cohen et al. | |
| 2013/0297767 A1 | 11/2013 | Kozine et al. | |
| 2014/0310235 A1 | 10/2014 | Chan et al. | |
| 2014/0344186 A1 | 11/2014 | Nadler | |
| 2015/0205691 A1 | 7/2015 | Seto | |
| 2015/0213631 A1 | 7/2015 | Vander Broek | |
| 2015/0332414 A1 | 11/2015 | Unser et al. | |
| 2016/0065604 A1 | 3/2016 | Chen et al. | |
| 2016/0086284 A1 | 3/2016 | Ghosh et al. | |
| 2016/0086384 A1 | 3/2016 | Stroila | |
| 2016/0217022 A1 | 7/2016 | Velipasaoglu et al. | |
| 2016/0224899 A1 | 8/2016 | Nguyen et al. | |
| 2016/0239756 A1 | 8/2016 | Aggour et al. | |
| 2016/0366547 A1 | 12/2016 | Hodges et al. | |
| 2017/0249763 A1 | 8/2017 | Garvey et al. | |

OTHER PUBLICATIONS

Bay, S. D. et al, "Mining Distance-Based Outliers in Near Linear Time With Randomization and a Simple Pruning Rule," Proceedings of the 9th ACM SIGKDD, Aug. 24-27, 2003, pp. 29-38.

Breunig, M. M. et al., "LOF: Identifying Density-Based Local Outliers," Proceedings of the 6th ACM SIGKDD, 2000, pp. 93-104.

Hill, D. J. et al., "Real-Time Bayesian Anomaly Detection for Environmental Sensor Data," 32nd Congress of the International Association of Hydraulic Engineering and Research (IAHR), 2007, 10 pages.

Jiang, N. et al., "Research Issues in Data Stream Association Rule Mining," ACM SIGMOID Record, 2006, pp. 14-19.

Liu, F. et al., Isolation Forest, 2008 Eighth IEEE International Conference on Data Mining, ICDM '08, 2008, pp. 413-422.

Scholkopf, B. et al., "Support Vector Method for Novelty Detection," Advances in Neural Information Processing Systems 12, 2002, 582-588.

United States Office Action, U.S. Appl. No. 14/847,656, dated Sep. 27, 2018, ten pages.

United States First Action Interview—Office Action, U.S. Appl. No. 14/847,656, dated Jan. 29, 2018, ten pages.

\* cited by examiner

SYSTEM EVENT ANALYZER AND OUTLIER VISUALIZATION

CROSS REFERENCE TO RELATED APPLICATIONS

This application is a continuation of co-pending U.S. application Ser. No. 14/847,656, filed Sep. 8, 2015, which is incorporated by reference in its entirety.

BACKGROUND

This invention relates generally to analysis of events in a system, and more particularly to automated identification and visualization of event outliers and outage detection.

Many different types of systems generate data streams that provide near-continuous event data describing events occurring on the systems. Examples include network monitoring, click streams, web server log records, packet flow data of internet providers, phone logs, sensor data streams, traffic monitoring, credit card transactions, financial tickers, video surveillance, and power usage. When problems develop with these systems, these problems can greatly impact the revenue and reputation of a company. These underlying problems may present themselves in the underlying data stream, but are challenging to identify, making timely detection difficult and delaying an appropriate investigation and response.

Outlier detection in continuous data streams can differ from outlier detection of a static data set. Typically, the large data size of a continuous data stream prohibits disk storage, the large data volume influx prohibits passing over the data more than once, the continuous nature of streaming data results in an unbounded time series, and streaming data often evolves over time. In addition, detection of outliers in the data set near the time that they occur (i.e., before they become stale) is critical to a timely response, while an alert based on a detection of an outlier should prevent false alarms. In addition, outliers may be caused by many reasons, only some of which may represent a problem with the monitored systems. Without a thorough analysis of these outliers, there is a risk of over or under reporting outliers that are not related to system outages.

SUMMARY

Various embodiments and examples described herein provide an event analysis system that monitors data streams received from other systems to detect whether an event has occurred that may potentially result in such systems' experiencing downtime or degradation of system performance. Still further, the event analysis system can provide visualizations (e.g., a user interface) to enable a user of the system to determine which system(s) or metric(s) of a system depend on each other. The user can interact with the user interface to identify which system(s) or metric(s) have been affected as a result of a system's performance degradation.

An event analysis system receives a data stream of events of a variety of event types to identify outliers for each type of event. As described herein, an outlier can refer to a measured amount or a metric that exceeds an upper threshold value or that fails to meet a lower threshold value. To identify outliers, the event analysis system determines one or more alert threshold values for an evaluated time for each of the event types from historical event data. The alert threshold values indicate threshold values at which event data exceeds a range of expected, or "normal" results. The alert threshold values for a given event type are determined from prior data for that event type. The data for an event type may be stored as a window or "tile" of data representing a segment of time. For example, each fifteen minutes may be stored as a data tile, summarizing the data values during that fifteen minutes and indicating the frequency that the event type occurred. To determine the alert threshold value, the event analysis system selects a set of data tiles for time windows on prior days or weeks to determine data tiles that reflect the particular changes in the data stream that may reoccur on similar times of day or by the same day of the week. A set of summary statistics of each time window (which may include several data tiles) is generated and a trend of the event data from the summary statistics is used to generate the alert threshold values. In addition, the alert threshold values may also account for shorter-term trends prior to the evaluated time to provide short-term fluctuation to the alert threshold values.

Using the alert threshold values, a set of subject events is compared against the alert threshold values to determine an alert level for the event type. The alert level identifies whether the event data for the event is within a normal range for the event type based on the alert threshold values, or whether the event data is above or below a normal range. The alert levels may be analyzed to determine whether to alert an operator to outliers in the event data, particularly when those outliers may represent a system outage or other severe problem. To analyze the separate events, the alert levels are analyzed to determine a system health score. The system health score summarizes the alert levels from the various events, and may increase the weight of alert levels for events that are highly correlated with other events, and when the highly-correlated events also show an alert. The system health score may be compared against a notification threshold to determine whether to alert an operator to the status of the system. In one embodiment, the threshold is adjusted based on asynchronous actions that may affect the events, which may increase or decrease the notification threshold. For example, known updates to the system's software may decrease the notification threshold to increase the sensitivity to outliers and ensure there were no problems with the software update.

Using the identified alert levels for the variety of event types, a display is generated to indicate the alert levels for the various event types, indicating for each event type whether it is above or below the threshold by a glance. In the display, the event types are clustered according to the correlation between the event data for the event types. When the correlation exceeds a threshold, a link may be generated between the event types to indicate a correlation to a user viewing the display. The event types and the related alert levels are displayed to the user along with the generated link. This permits a user to determine at a glance what event types are outliers from the data and permit investigation of the related event types to investigate possible sources of the outlying data.

In these ways, the generated alert levels assist detection of outliers in the event data, while that data is analyzed to determine a notification and may be visualized to assist in analysis and identification of a root cause.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
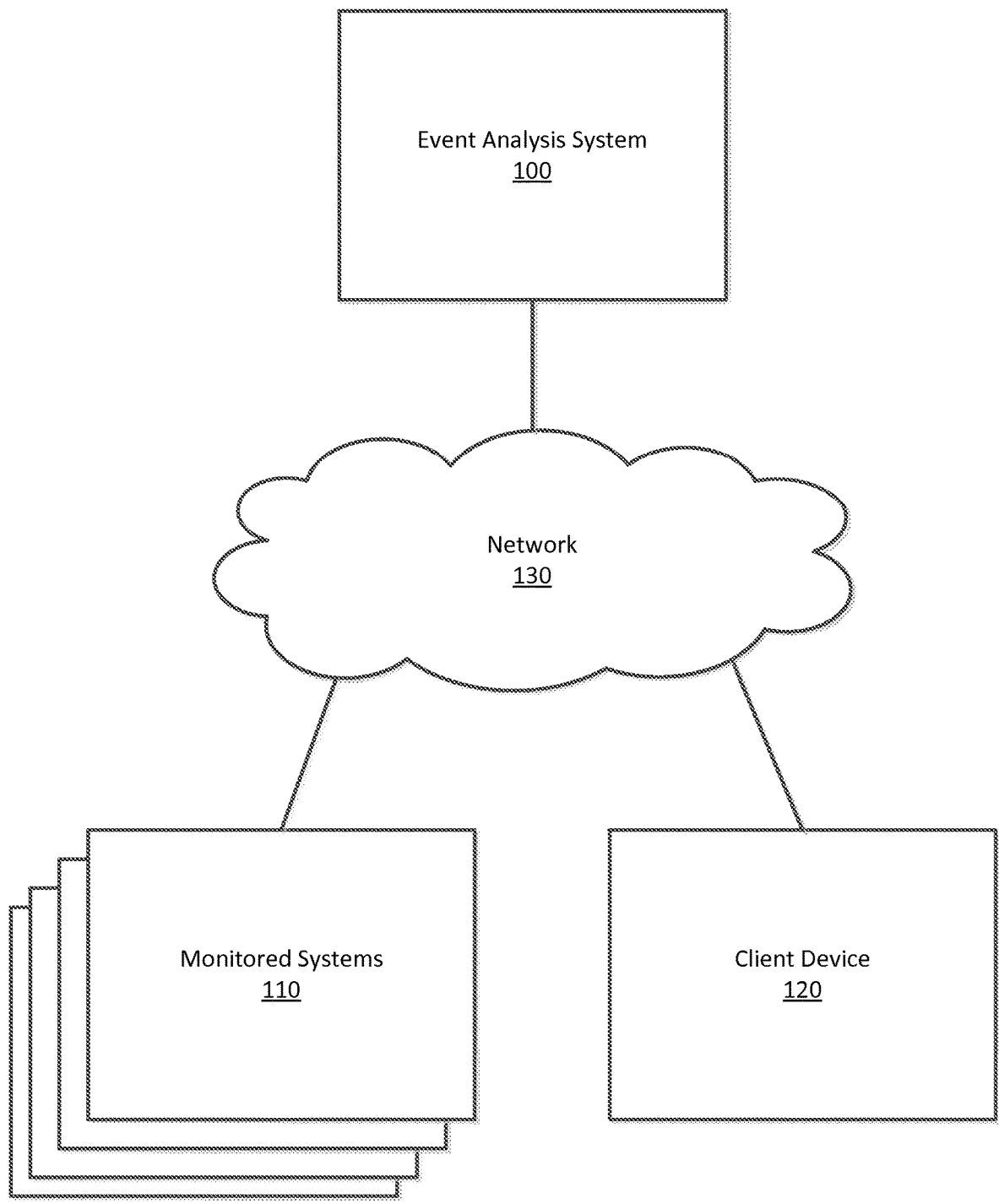
FIG. 1 shows an environment in which an event analysis system operates, according to one embodiment.

FIG. 1 shows an environment in which an event analysis system 100 operates, according to one embodiment. In this example, the event analysis system 100 receives event data from one or more monitored systems 110 and provides event analysis and outlier detection information to client device 120. These systems may be connected via a network 130, such as the internet, or another transmission channel for communication between these systems.

Monitored systems 110 provide streams of event data to the event analysis system 100 and are typically computing devices that report data regarding actions or status of the monitored system. The events generated by the monitored systems 110 can include asynchronously-generated events (e.g., those that occur on a user action), and may include reporting monitored data that is polled at specified time periods, such as CPU or memory utilization levels that are monitored and reported at a particular frequency.

According to some examples, such an event analysis system 100 and/or the monitored systems 110 can be a part of or can collectively correspond to an on-demand service arrangement system, such as a transport arrangement system. The monitored systems 110 can include systems for performing various services for the transport arrangement system (including back-end (server-side) systems and front-end (client-side) systems), such as applications operating on provider devices and/or client devices, a real-time system that communicates with client devices, a request processing system to receive requests for transports from clients (e.g., riders) operating client devices, a vehicle or provider selection system identifies a provider (e.g., a driver) to provide transport services for requesting clients, a fare calculation system to determine the fare for individual transport services based on data received from provider or vehicle devices, a payment processing system to authorize payments associated with client accounts, etc. The event analysis system 100 can be operated by administrative users of the transport arrangement system to monitor the health (e.g., the condition) of the individual systems 110 and/or the transport arrangement system as a whole.

Typically, the data monitored by event analysis system 100 may include hundreds, thousands, tens of thousands, or more, different types of data generated by the monitored systems 110, which may be modeled by the event analysis system 100 as a time series (i.e., data points having distinct points in time), though the events themselves may be asynchronously generated by the various monitored systems and their underlying components. As one typical use case, for example, as providers and clients access the on-demand service arrangement system, individual actions by the providers and clients (on provider and client applications on respective provider and client devices) may generate events reported to the event analysis system 100. Such events may include individual transitions between pages of a sign-up or account creation process, or requests by the client to receive a service and at each action or selection by a user in requesting the service, as well as each action of a provider indicating its availability and accepting a request from the client. Each of these events may generate a unique event type to the event analysis system 100. These events may be generated by many individual monitored systems 110 or a single monitored system 110 may report events to the event analysis system 100. While illustrated here as separate systems, in one configuration the monitored system 110 includes the event analysis system 100 as one of its components.

The client device 120 provides an interface for a user to communicate with the event analysis system 100 to request and display event analysis information from the event analysis system 100. The client device 120 is a computing device that provides a display and interface for a user to enter the requests and display information received from the event analysis system 100.

Figure 2:
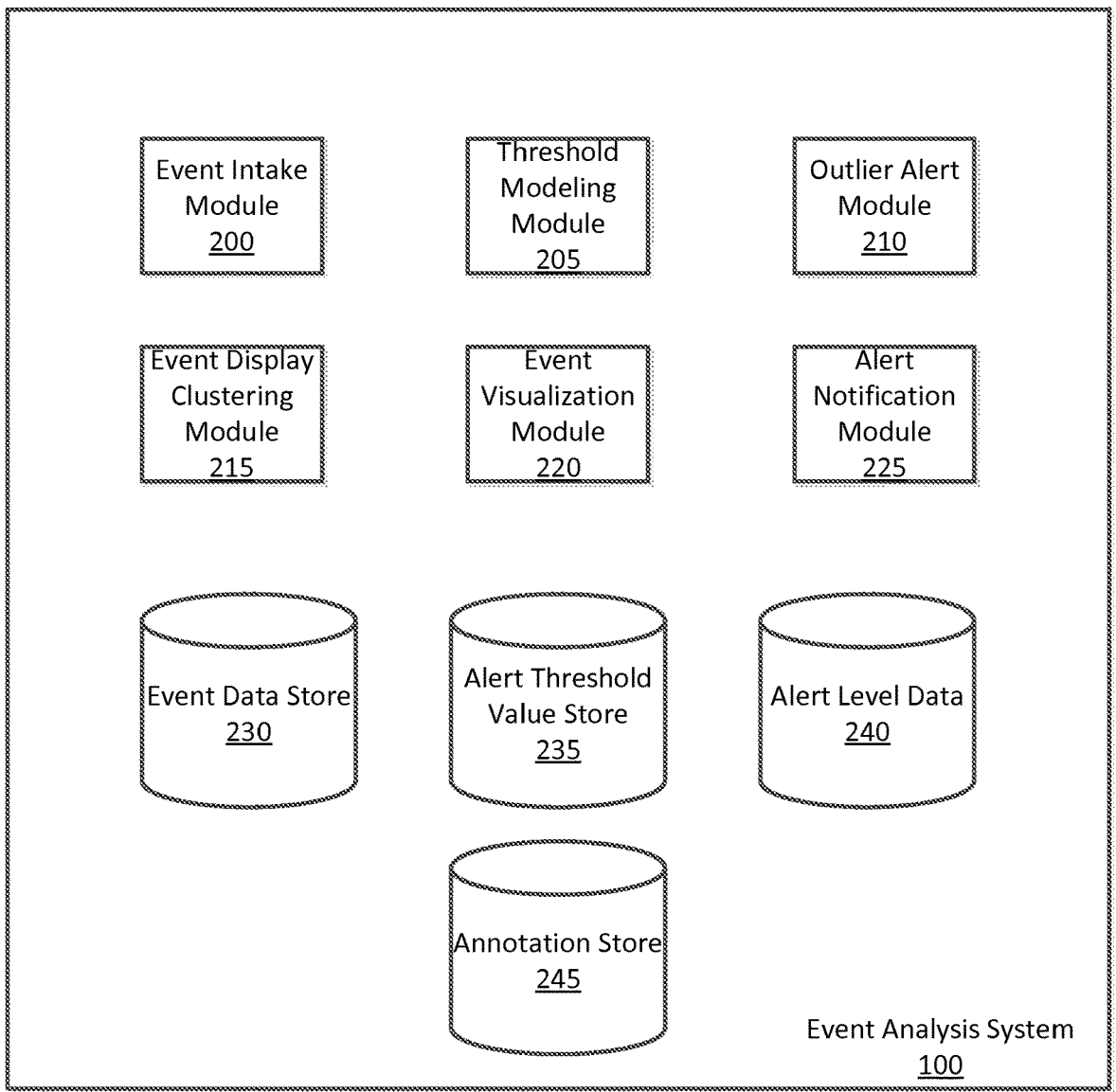
FIG. 2 shows components of the event analysis system, according to one embodiment.

FIG. 2 shows components of the event analysis system 100, according to one embodiment. The event analysis system 100 in this example include various computing modules and data stores for analyzing the event data received from the monitored devices 110, though in other embodiments more or fewer modules and data stores may also be included. These modules include an event intake module 200, a threshold modeling module 205, an outlier alert module 210, an event display clustering module 215, an event visualization module 220, and an alert notification module 225. The data stores shown in this embodiment include an event data store 230, an alert threshold value store 235, an alert level store 240 and an annotation store 245. While four individual data stores are illustrated in the example of FIG. 2, in other examples, the individual data stores can comprise multiple databases or data stores. Still further, the data stores can be included in or can be a part of another system, and the component(s) of the event analysis system 100 can access and communicate with the data stores over one or more networks. Certain information may also be described herein as part of a data store, though in various embodiments the information related to that data store may be used by the event analysis system 100 without being stored to a non-volatile storage in varying embodiments.

The event intake module 200 serves as a front-end of the event analysis system 100 with respect to the monitored systems 110. As monitored systems 110 generate and report events, these events are received by the event intake module 200 (e.g., continuously, periodically, based on a schedule, etc.). The event intake module 200 may receive the event data associated with a vast number of different types of events. The event intake module 200 stores the received events to the event data store 230. In addition, the event intake module 200 may also manage the received event data to group or consolidate the event data for a particular type of event. For example, a monitored system 110 can provide event data relating to a particular event type, such as a client's request for a service, and the event intake module 200 may consolidate the event data across many such client requests before storage to the event data store 230. In this example, the data may be consolidated by aggregating individual events (summed) over an update frequency for the event data. Alternatively, the data may be consolidated as a quantile or a fraction of the event data at the update frequency. For example, this certain data may be updated each minute, in which case the received events of that event type are summarized for each minute and the summarized data is stored to the event data store 230. Thus, certain event data may represent a quantity (or other aggregation) of an event over an individual period of the update frequency (e.g., the number of times providers have opened the provider application on a device every thirty seconds in a certain geographic area). In addition to storing the event data, the event intake module 200 may also provide the event data to the outlier alert module 210 to determine whether received events exceed an alert for the event type.

For illustrative purposes, examples of various types of event data are described herein. In some examples, the event data can correspond to a number of times particular inputs are provided by users of client applications in a duration of time, such as different taps/selections, swipes, interactions with the client applications, etc., or can correspond to a number of times client applications have crashed during a period of time. In another example, the event data can correspond to a number of times new providers or new users have created respective accounts or signed up with the on-demand service arrangement system in a duration of time. Still further, in one example, the event data can correspond to monetary amounts paid out to service providers at scheduled instances of time (e.g., to determine whether a monetary amount that is scheduled to be paid out or is actually paid out is too large to be accurate, and thus is an outlier, etc.).

The event intake module 200 may also manage and store annotations in annotation store 245. In another embodiment, another component may manage the annotation store 245, and need not be the same module that intakes event data. An annotation describes asynchronous actions that may affect the event data for one or more event types. Thus, these are actions received by the event analysis system 100 and known to have a likely impact on one or more event types, and may provide possible explanations for a significant increase or decrease in event data. Such actions may originate from different sources, such as internal or external sources to the system. As examples of such annotations related to internal sources may include changes to code or application programs associated with the monitored systems 110 (e.g., a new code release to a server or client), pricing increases or decrease for a service provided by the monitored systems 110, or planned downtime or outages for monitored systems 110. Examples of annotations related to external sources may include weather (e.g., rain, storms, hurricanes, floods), and significant gatherings of people (e.g., sporting events, concerts, and political rallies).

Each annotation may indicate the type of action (e.g., weather), when the action occurs, the source of the action, and a definition of events likely to be affected by the annotation. In some embodiments, the annotation does not specify events likely to be affected by the annotation. The definition of events likely to be affected by the annotation may specify individual event types, or may specify characteristics of those event types. For example, the characteristics may specify a geographical area or a monitored system 110 or component expected to be affected by the annotation. In addition, the annotation may also specify whether the annotation should increase or decrease sensitivity of the event monitoring. For example, a change to code operating on the monitored systems 110 may be indicated as increasing sensitivity (as this may indicate problems with the code release), while a sporting event will decrease sensitivity (as a large crowd is likely to abnormally increase demand).

The annotations may be provided by an operator of the event analysis system 100, or may be automatically retrieved from another system, which may be based on the type of annotation. For example, an operator may indicate that a change to the code operated on a monitored system 110 is occurring at a given time, while the event analysis system 100 may routinely query another system to receive weather and gathering information.

In order to determine outliers in event data for individual event types, the event analysis system 100 can automatically determine a threshold value(s) for that event data by forecasting or predicting a range of expected values for that event data using previously received event data (e.g., historic data). In one example, the threshold modeling module 205 analyzes the event data in the event data store 230 and generates one or more alert threshold values for each event type for a given evaluation time. That is, an alert threshold value may change over time for different evaluation times as additional event data is received for the event type. The threshold modeling module 205 identifies an alert threshold value for each event type for which an alert is desired, and may generate one or more alert threshold values indicating whether the value of the event type at the evaluated time is an outlier. When more than one alert threshold values are used, the different alert threshold values may indicate the extent to which the value exceeds the predicted values (i.e., a 'normal' value for the event data at the evaluated time). Thus, using several alert value thresholds may indicate whether an event data point is simply outside a range of expectations (e.g., resulting in some additional load to a system, such as a larger than typical or 'normal' amount of providers going on-duty or having a certain provider state in a duration of time) or deviates greatly from the range of expectations (e.g., will presumably result in a total failure of a component/system or a significant software bug).

Figure 3:
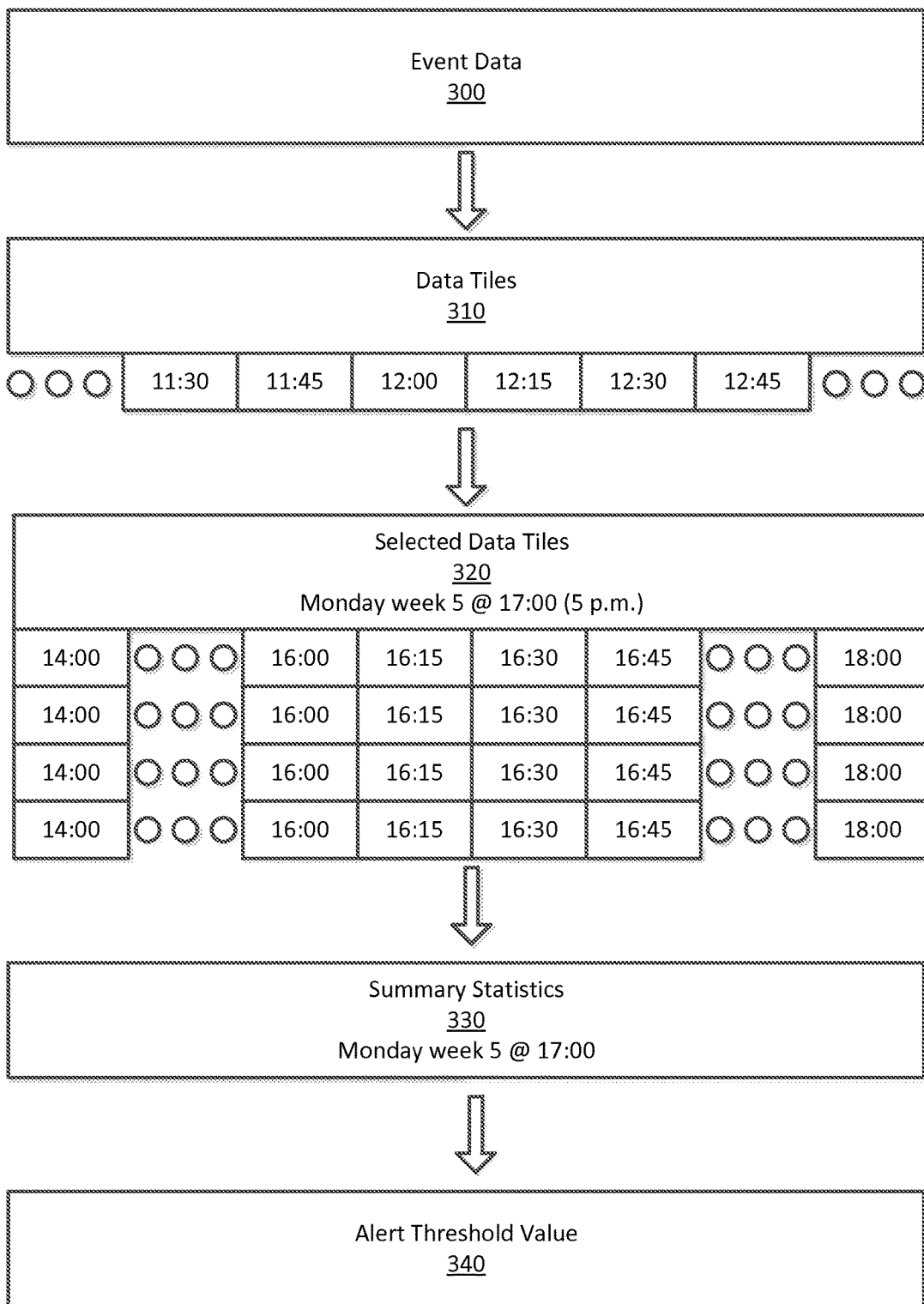
FIG. 3 shows a data processing illustration for generating an alert value thresholds for a type of event data according to one embodiment.

FIG. 3 shows a data processing illustration for generating an alert value threshold for a type of event data according to one embodiment. This processing may be performed by the threshold modeling module 205 according to one example. The threshold modeling module 205 retrieves the event data 300 and processes the event data 300 to identify a set of data tiles 310 for the event data. As the historical data for a given event may have a relatively high variance from one update period to another, a data tile groups several update periods to provide, from one data tile to another, smoothing of the event data. Thus, a data tile 310, as referred to herein, represents summarizes a group of event data for several contiguous update periods of the event type. For example, an event that has an update period of a minute (i.e., the event data is updated each minute as described above by the event intake module 200) may be summarized by a fifteen minute data tile. In this example, each time segment of fifteen minutes may be stored as a data tile, summarizing the data values during that fifteen minutes and indicating the frequency that the event type occurred. As shown in this example, the data tiles 310 include each fifteen minutes of event data, such as 11:30-11:45, 11:45-12:00, 12:00-12:15, and so forth. By using the data tiles for aggregated data, particularly for relatively less recent event data, a larger amount of event data can be more easily processed and summarized and used to predict trends of the event data while maintaining some granularity.

For many types of event data, the event data is predicted by accounting for the seasonality of the event data in the time-series. The seasonality of the event data reflects the patterns that may repeat in the data over larger-term trends, e.g., slower-moving trends. The seasonality of prior days or weeks reflects the particular changes in the data stream that may reoccur on similar times of day or by the same day of the week. For example, traffic congestion may vary seasonally week-to-week (i.e., the same day of the week may have similar trends).

To identify an alert threshold value at a given time ("the evaluated time"), the threshold modeling module 205 assesses longer-term trends in the event data using the data tile 310. To account for the seasonality of the event data, the threshold modeling module 205 selects a set of data tiles 320 in a window of time for each of a set of seasonally-adjusted windows. The window of time may include data tiles 310 that are prior to and ahead of the evaluated time in the time-series when seasonally adjusted. Including the data tiles 310 ahead of (i.e., after) the evaluated time, the evaluated time provides data for past performance at the evaluated time (at the seasonal adjustment).

In the example of FIG. 3, the window is four hours long and includes three hours before and one hour after the evaluated time, and the seasonal adjustment is one week, though variations on the amount of time in the window and the specific amount of time to adjust in window selection vary based on embodiments and the particular characteristics of the event data. In this example, to evaluate a certain time, such as Monday at 5 p.m., for a certain week, e.g., week 5, the threshold modeling module 205 selects a set of data tiles 320 for a window of time between 14:00 and 18:00 for a set of prior weeks, weeks 1, 2, 3, and 4. Thus, the selected data tiles include a portion of the complete set of data tiles, and may not include data tiles that are not selected as part of a seasonally-adjusted window. In some embodiments, in addition to the set of seasonally-adjusted windows, the data tiles prior to the evaluated time may also be selected. In this example, those data tiles are Week 5 on Monday, from 14:00 to 17:00.

The appropriate amount of time to delay for the seasonably-adjusted windows (i.e., a day, a week, etc.), in various embodiments, may be selected by an operator of the event analysis system 100. As an addition or an alternative, the seasonality adjustment may be determined automatically by the threshold modeling module 205 by an analysis of the event data, for example via sinusoidal modeling.

Using the selected data tiles 320, the threshold modeling module 205 summarizes each window with at least one summary statistic 330. As one embodiment, the statistic may be a median value, for example calculated as a rolling median at each hour in the window, or as a median for the entire window. Rather than a median, other statistics may also be generated.

Using the selected data tiles 320 and summary statistics 330, the threshold modeling module 205 generates an alert threshold value 340 for a particular event data. In one example, the alert threshold value 340 may be calculated using an auto-regressive integrated moving average (ARIMA) of the summary statistics 330 and/or the selected data tiles 320. The threshold modeling module 205 may also use summary statistics 330 and/or selected data tiles 320 with a predictive model, and for example may use the summary statistics 330 and as features for a machine learning model in order to determine one or more alert threshold values 340. By using the selected data tiles 320 and summary statistics 330, the threshold modeling module 205 may account for slower-moving features in the event data. The selected data tiles 320 may thus provide a prediction of the event data at the evaluated time using a seasonal adjustment of the event data.

The alert threshold value in various embodiments may be composed of more than one predictive term, in which the prediction using a seasonal adjustment may be one term among others as further described below.

In addition, the alert threshold values 340 may also account for shorter-term trends prior to the evaluated time to provide short-term fluctuation to the alert threshold values. In various embodiments, the alert threshold value 340 incorporates several predictive terms, one of which may be the In one embodiment, the alert threshold value 340 accounts for shorter-term variation in the event data as another predictive term. This shorter-term variation may be in addition, or as an alternative, to the seasonally-adjusted predictive term based on the selected data tiles 320 and summary statistics 330. To identify the short-term fluctuation term, the threshold modeling module 205 accesses event data for the event type immediately previous to the evaluation time and may identify the event data without further aggregating or summarizing the event data from the update frequency rate. Thus, this shorter-term event data may be significantly higher frequency, providing greater variation than the longer-term, seasonally-adjusted predictive term previously described above. In one embodiment, the high-frequency event data set includes the previous twelve hours of event data prior to the evaluated time and is separated into one-minute segments. The high-frequency data may be used to determine the extent to which the event data normally fluctuates within its update period. In general, the high-frequency event data set includes event data that may exceed window of the seasonal calculation portion of the alert threshold value 340.

In one embodiment, a set of alert threshold values for an individual event type is calculated based on Equation 1:

$$T_{\pm}(t) = P_s(t) + \alpha_{\pm}(P_{hf}(t) + \varepsilon) \qquad \text{Equation 1}$$

in which:
t is the time for which the event threshold value is being determined;
$T_{\pm}(t)$ represents an upper alert threshold value $T_+(t)$ and a lower alert threshold value $T_-(t)$;
$T_+(t)$ is determined by evaluating Equation 1 using a positive scalar $\alpha_+$, which is greater than 0;
$T_-(t)$ is determined by evaluating Equation 1 using a negative scalar $\alpha_-$, which is lower than 0;
$P_s(t)$ is a predicted value of the event type at time t using the seasonally-adjusted windows;
$P_{hf}(t)$ is a predicted value of the event type at time t using the high-frequency event data set; and
$\varepsilon$ is an error term.

The error term $\varepsilon$ may include an error term based on the forecasting of each predicted value and an error term from the summary statistics 330.

The positive and negative scalars $\alpha_+$ and $\alpha_-$, may be selected to adjust the sensitivity of the alert levels. The scalars may be selected by an operator of the event analysis system 100, or may be automatically learned by a machine learning module based on whether the outliers are over or under inclusive.

Thus, Equation 1 calculates the upper alert threshold by adding a predicted value of the event type at time t using the seasonally-adjusted windows with a predicted value of the event type at time t using the high-frequency event data set as modified by an error term and a scalar. Equation 1 calculates the lower alert threshold by reducing a predicted value of the event type at time t using the seasonally-adjusted windows by a predicted value of the event type at time t using the high-frequency event data set as modified by an error term and a scalar.

More generally, Equation 1 describes a method for determining an alert threshold value by identifying a general trend in the event type at the evaluated time using the seasonally-adjusted windows, and adjusting the general trend using a prediction determined by the high-frequency data. The adjustment using high-frequency data prediction may be scaled with the scalar to tune the sensitivity of the model to the high-frequency variations.

Additional alert threshold values for the event type may be generated using Equation 1 by re-calculating using additional scalars α. These additional alert threshold values may indicate increased or reduced deviation from the prediction.

In other embodiments, the alert threshold value may further or alternatively use a term related to the recent trend in the data and a term for annotation data related to the event type. Thus, the alert threshold value for an event may also account for a recent trend of event data. This recent trend may be a shorter amount of time than the high-frequency data, and indicates whether the event data is generally trending higher or lower by determining a gradient of the trend. In one example, the recent trend is based on the one hour of event data prior to the evaluated time, while the high-frequency data is based on the prior twelve hours.

In one embodiment, the recent trend prediction is calculated by determining a rolling median of the event data at each update period over the period of time assessed by the recent trend data, and determines a gradient using the rolling medians.

In a further example, the annotation data may also be used to determine an annotation term for the alert threshold value. When annotation data is associated with an event type at the evaluated time, the annotation data may be used to adjust the thresholds higher or lower based on the prior behavior of the event data when similar annotations have occurred. To determine the expected adjustment based on annotations, a machine learning model may analyze previous annotations of the same type to predict the impact of the annotation on the affected event data.

In one embodiment, a set of alert threshold values for an individual event type is calculated based on Equation 2:

$$T_\pm(t) = P_s(t) + \alpha_\pm(P_{hf}(t) + P_r(t) + P_A(t) + \varepsilon) \quad \text{Equation 2}$$

in which:
t is the time for which the event threshold value is being determined;
$T_\pm(t)$ represents an upper alert threshold value $T_+(t)$ and a lower alert threshold value $T_-(t)$;
$T_+(t)$ is determined by evaluating Equation 1 using a positive scalar $\alpha_+$, which is greater than 0;
$T_-(t)$ is determined by evaluating Equation 1 using a negative scalar $\alpha_-$, which is lower than 0;
$P_s(t)$ is a predicted value of the event type at time t using the seasonally-adjusted windows;
$P_{hf}(t)$ is a predicted value of the event type at time t using the high-frequency event data set;
$P_r(t)$ is a predicted value of the event type at time t using the recent trend for the event data;
$P_A(t)$ is a predicted value of the event type at time t using the annotation data; and
$\varepsilon$ is an error term.

As shown in Equation 2, in one embodiment the alert threshold levels are calculated based on terms including predictions from the seasonally-adjusted window and the high-frequency events, and further incorporate a prediction from the recent trends and from applicable annotation data. In this example, the alert threshold value may incorporate the seasonally-adjusted window to provide a baseline prediction of the event data, the high-frequency data to provide frequency variations, the recent trend to provide a gradient local to the evaluated time, and the annotated events to account for known existing annotations that are expected to affect the event data.

Also in this example, a common scalar α is shown, though in other embodiments each of the predicted values may have a respective scalar to weigh the relative contribution of each term. For example, the scalar for a prediction related to annotation data may be increased or decreased based on whether the annotation is designated as increasing or decreasing sensitivity, as described above with respect to the annotation store 245.

The alert threshold values may be generated by the threshold modeling module 205 for each of the event types. In addition, threshold modeling module 205 may generate the alert threshold values periodically for continuous comparison of the event data to the alert threshold values. As the alert threshold values are based on the seasonally-adjusted data and individual to each event, the alert threshold values may be generated for each event type independently and can be parallelized by the event analysis system 100, and can at least in part be calculated in advance of the evaluated time.

Referring back to FIG. 2, after generating one or more alert threshold values 340, the threshold modeling module 205 stores the alert threshold value to the alert threshold value store 235. The threshold modeling module 205 may generate one of more alert threshold values 340 for each of the event types analyzed by the event analysis system 100.

In some examples, the outlier alert module 210 monitors received event data for an event and determines whether the event data constitutes an outlier by comparing the event data to the alert threshold values of the event. Depending on implementation, the outlier alert module 210 can compare the received event data periodically (e.g., every second, every two seconds, etc.) or each time the event data is received. When the event data exceeds or falls below an alert threshold value, the outlier alert module 210 identifies an alert level associated with the event value and may store the alert level in the alert level data 240. As an addition or an alternative, the outlier alert module 210 can trigger the alert notification module 225 to generate and transmit a notification to one or more operators designated to receive notifications about the particular event or event type. In some embodiments, the alert level is a Boolean value (i.e., the value is an outlier or is not an outlier), while in other embodiments the alert level indicates a positive or negative outlier relative to the prediction, and may also indicate a severity of the outlier.

Using the alert level data 240, the event visualization module 220 generates a user interface (e.g., a presentation) that includes content (e.g., textual and/or graphical content) depicting event types and the associated alert levels. Such a user interface can be displayed on a client device (e.g., the client device 120) that is in communication with the event analysis system 100. For example, an operator of the event analysis system 100 can interact with the user interface to identify trends and possible causes of outlier data. The event visualization module 220 presents, in the user interface, the event types in a set of clusters to indicate the relationship between the various event types, where each event type is displayed as a node (e.g., also referred to herein as an event node).

In one example, the event visualization module 220 can communicate with the event display clustering module 215 (or stored data about data clusters) to generate the user interface. To determine the clusters of events, for example, the event display clustering module 215 analyzes the event data for each event type and determines a correlation between the event types. The correlation may be determined, for example, by determining Pearson's coefficient between the event types. The correlations between the data types is then used to cluster the event types. In addition, the display clustering module 215 may identify, from the event data types, which are representative. The representative data types may be identified to represent a set or group of event data types, rather than selecting all data types for display in the event visualization module 220.

Still further, the alert notification module 225 may generate a notification to a user when there is an alert for one or more of the event types. The notification may be sent to a client device of the user to permit the user to quickly respond to the conditions that caused the alert to occur. The alert notification module 225 generates the alert when it determines that the alert levels for the event types meet a threshold for notification. The alert notification module 225 may also determine the centrality of a node (i.e., the extent to which it is correlated with other event types) for the nodes which have an alert level to determine whether to send an alert. Additional mechanisms for generating a notification are described below.

In one embodiment, a system health score is calculated by the alert notification module 225, for example, to reflect the general state of the monitored event data overall at a given time. This system health score may indicate the quantity of alert levels in the event data for an evaluated time, and whether the nodes that have an elevated alert level are highly connected with other events, which may indicate whether an alert is central to the system's functioning, or a more peripheral issue that is not affecting the system as a whole. To determine the system health score, the alert notification module 225 combines the alert levels for individual event nodes. In addition, the system health score may incorporate the centrality of each event node and whether related event nodes also have an alert level to adjust the contribution of that event node to the system health score. This contribution may be implemented as a modification of the alert level for the individual event node when contributing to the system health score. The centrality of an event node reflects the correlation of that node with the other event nodes in the system. That is, an event node that has a high correlation with many other event nodes may also have a high centrality. In addition, an event node's alert level may be adjusted if other event nodes that are highly correlated also have an alert level. In this way, individual, unconnected nodes may have a lower impact on the system health score, while highly-connected nodes and nodes connected with other alerting nodes present a much stronger indication that there may be a more grave problem in the monitored systems.

Using the system health score, the alert notification module 225 may determine whether to generate an alert for an operator of the system to review and optionally correct the monitored systems 110. To determine whether to generate an alert, the alert notification module 225 monitors the system health score and determines when the system health score warrants notifying a user. In various embodiments, the system health score is further processed to determine whether to notify a user. As further described below, this processing may include determining the system health score over time (e.g., to determine whether it reflects a momentary spike in values or a more persistent problem) and determining whether the system health is attributable to an annotation, rather than a system outage or other unexpected problem.

In one embodiment, when the system health score exceeds a notification threshold, the alert notification module 225 monitors to the system health score to determine whether the system health score exceeds the notification threshold for a specified length of time. That is, the alert notification module 225 may ensure that the system health score has remains high, and is not a momentary problem that resolves itself. This length of time may be five, ten, fifteen minutes, or more, depending on the configuration.

When the system health score exceeds the threshold for the requisite length of time, the alert notification module 225 may identify a client device associated with an operator of the event analysis system 100 and send an alert to that client device. In additional embodiments, the selection of an operator or more than one operator to receive the notification depends on the system health score and the events that are generating alert levels. That is, there may be more than one notification threshold, such that when higher thresholds are reached by the system health score, additional users are notified, typically escalating the alert up an organizational structure of individuals managing the monitored systems 110. In further embodiments, the alert notification module 225 may identify which event nodes are predominantly contributing to the high system health score, and notify those operators responsible for these contributing event nodes.

In certain embodiments, before sending an alert, the alert notification module 225 determines whether any annotations are relevant and the interpretation of the system health score is modified accordingly. For annotations that designate that they increase the sensitivity of the alert detection, such as new code implemented by the monitored systems, the notification threshold may be decreased and, additionally or alternatively, the specified length of time for the system health score to exceed the notification threshold is reduced. Similarly, for those annotations that are designated to make the alerts less sensitive, the notification threshold may be increased and the specified length of time increased. In some embodiments, the alert notification module 225 may also identify specific events related to the annotations. For example, the annotations may indicate a concert occurring in a place. The alert notification module 225 may identify events related to that annotation (i.e., requests originating from that place) and determine a modified system health score that reduces or eliminates the contribution of those identified events to the alerting system. In this way, if another set of events is also still generating alert levels, the system may still identify a problem with the modified system health score and may issue a notification.

Figure 4:
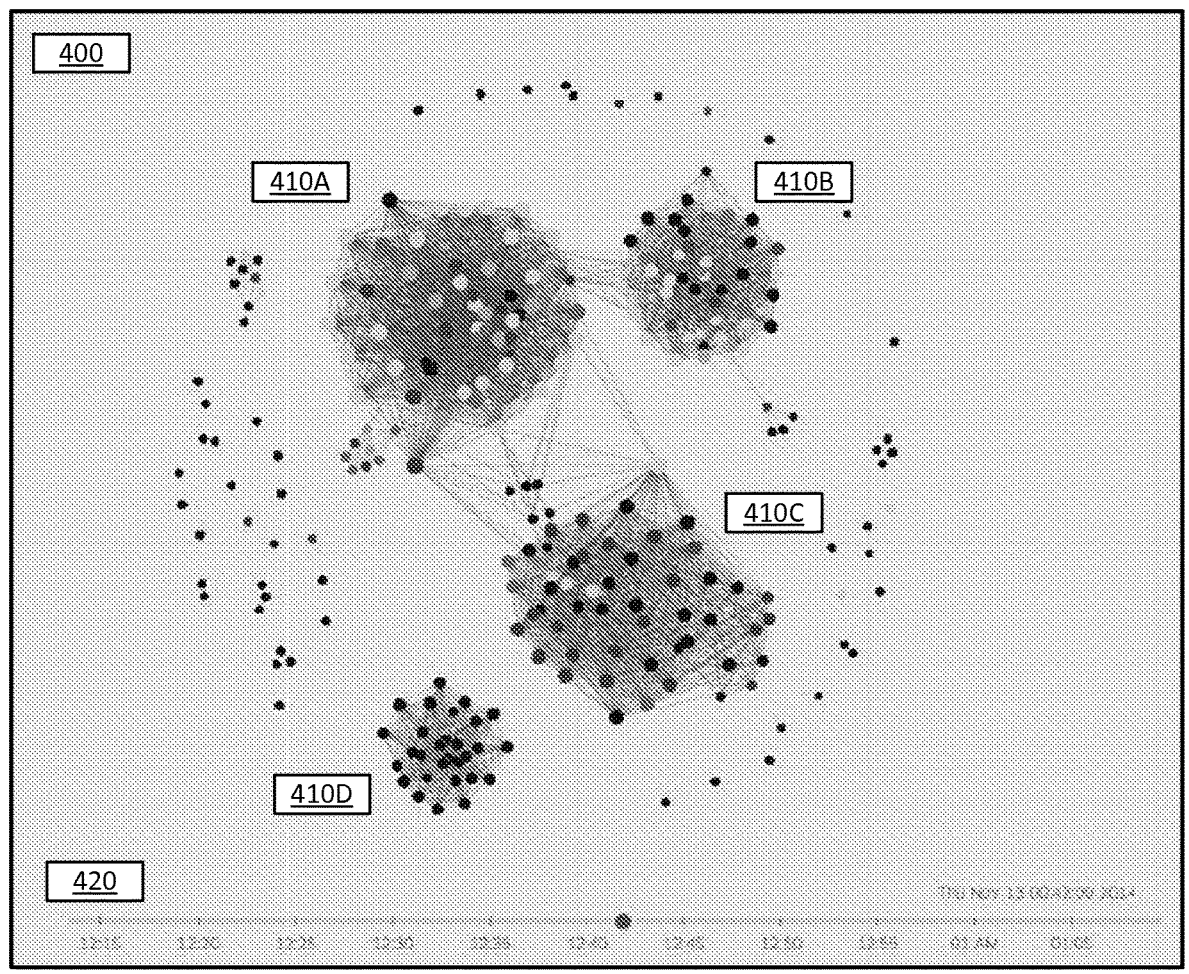
FIG. 4 shows an example display presenting alerts to a user for a set of event types.
Figure 4:
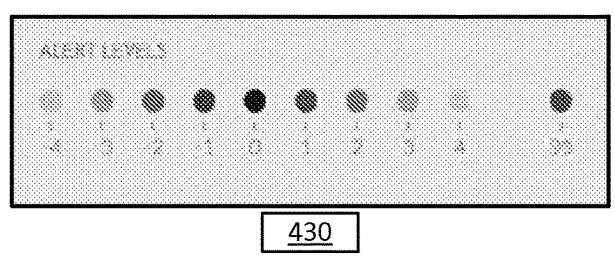

FIG. 4 shows an example presentation 400 that is displayed on a client device. Such a presentation 400 can be generated by, for example, the event analysis system 100 of FIG. 1. As shown in this example, a set of event clusters 410A-D illustrate events that are highly correlated with one another. In addition to the clusters, in this example, the display also includes connections (or edges) between event nodes or pairs of event nodes that are highly correlated with one another, which, for example, may connect events to generate the clusters themselves or to connect events in different clusters, such as the connections between clusters 410A and 410B, and between clusters 410C and 410A. For example, multiple individual event nodes within the cluster 410A can correlate with multiple individual event nodes within cluster 410C, as illustrated by the edges in the diagram of FIG. 4. To determine whether to display the connection, the event visualization module compares the absolute value of the correlation (i.e., without regard to whether the correlation is positive or negative) to a threshold correlation value, such as 0.5, 0.6, or 0.7. In one example, a pair of event nodes are connected by an edge if their correlation is greater than or equal to a threshold correlation value of 0.85.

In one example, each of the event types is displayed as a node that is coded to indicate the alert level for the event type at the evaluated time. The alert levels may be displayed in a key 430 that indicates the severity of the codes. For example, the key 430 can depict a color-coding in which a spectrum of colors (from light red to dark red to dark blue, etc.) corresponds to a particular alert level. In this example, cluster 410B includes several event types that are at an alert level "4" as indicated by the alert level key 430, while cluster 410A includes several event types that are at an alert level "−4." This may indicate that the events in cluster 410B are very active and creating significantly more activity than normal, while the alerts for cluster 410A are unusually inactive. When a user interacts with an event node, e.g., by hovering a pointer over the event node or by selecting the event node, information about the event node may be displayed to the user, such as the name of the event node, its expected/predicted value, and the current value.

As indicated by the connections between nodes in cluster 410B and 410A, there may also be a relationship between activity in 410B and 410A. For example, cluster 410A in this example may generally include events related to providing a service to customers, while the events in cluster 410B relate to setting up an account and payment information. In this example, the display of the clusters and event nodes may assist a user in identifying that there is a problem with account set up, which is impacting client requests for services and preventing clients from requesting the services. The display may also include a timeline 420 to enable an operator to adjust the evaluated time. As the operator moves an indicator on the timeline (shown in FIG. 4 at a time representing 12:42 AM), event data and alert levels are updated to indicate the change in the alerts over time. Because the events may change at a fine-grained level, the operator can identify when alert levels began to change for an event type and how those alerts spread to other event types. For example, by moving the indicator left (before 12:42 AM) or right (after 12:42 AM), the operator can see one or more nodes of clusters 410A-D dynamically change in color as in a manner in which their respective alert levels also changed. Though not shown in FIG. 4, the display may also include an indication of the overall system health score. In this way, the alert level coding, relationships between clusters of nodes, and selection of an element to adjust the evaluated time permits an operator to quickly grasp the change of event data, alert levels, and system health from a multitude of event types that are frequently changing over time.

Figure 5:
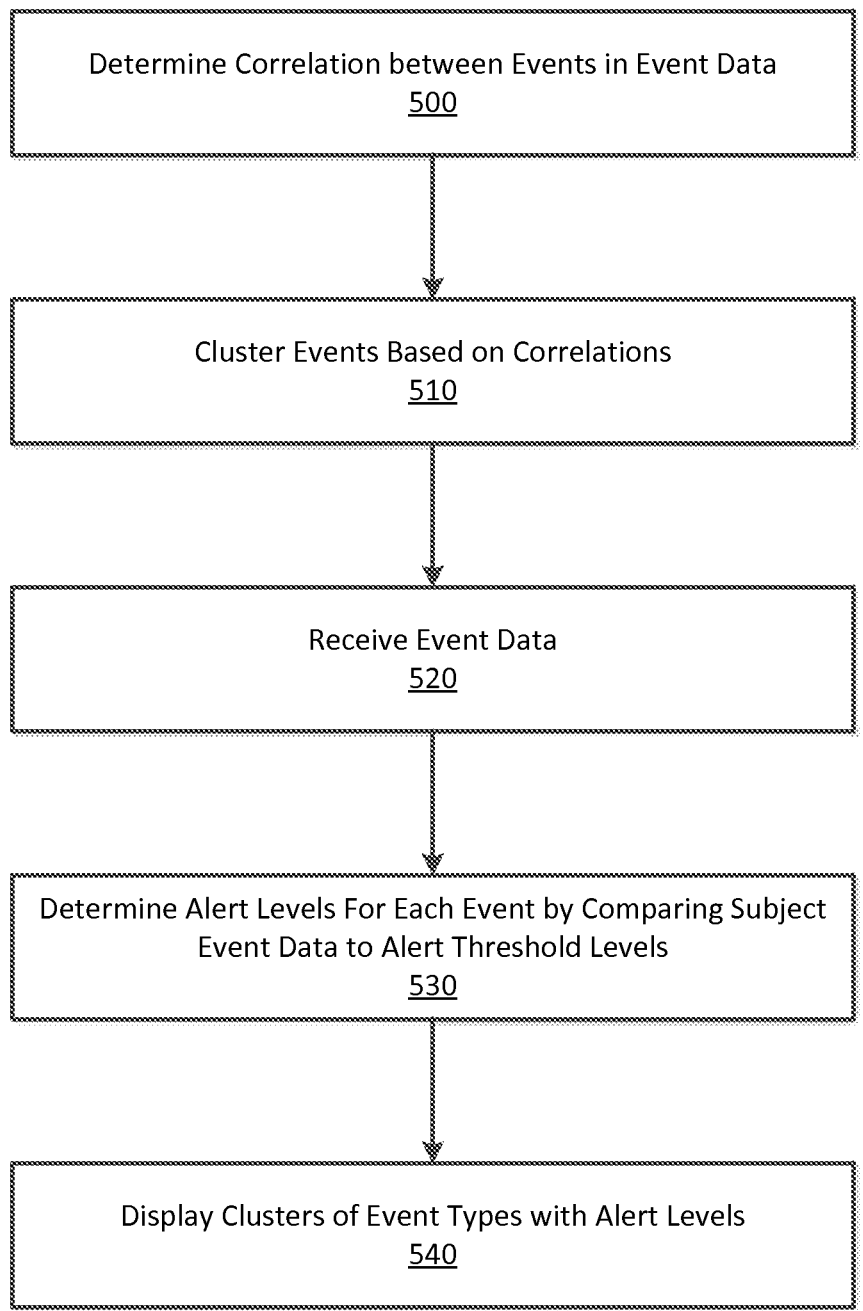
FIG. 5 shows a method for generating a display of event types according to one embodiment.

FIG. 5 shows a method for generating a display of event types according to one embodiment. This method may be performed by the event analysis system 100, and in certain embodiments, can be performed by the outlier alert module 210, the event display clustering module 215, and the event visualization module 220. The method shown in FIG. 5 uses the alert thresholds that may be generated by the threshold modeling module 205.

To determine placement and location of the event nodes in the display, the event analysis system 100 determines the correlation between events in the event data (500). Using the correlation measures, the events are clustered based on the correlations (510). Next, to determine the alert levels for each event, the event data for that time is received by the event analysis system (520), The received event data can be compared to the alert threshold levels as previously determined by the threshold modeling module 205 (530). Finally, the clusters of event types are displayed and coded with the alert levels, e.g., when an outlier is detected, or in response to user input to operate the visualization tool of the event analysis system (540).

While the foregoing system has generally been described with respect to a continuous data stream that is regularly monitored by the event analysis system 100, the outlier detection, system health score, and visualization, among other described techniques, may also be performed on a static data set and does not require a constant stream of data.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
identifying a time-series sequence of event data for a type of event;
identifying an evaluation time at which to determine an outlier in the time-series sequence;
identifying a seasonal adjustment for the event data;
selecting a set of windows of the time-series sequence, each window in the set of windows identifying a portion of time including the evaluation time as adjusted by the seasonal adjustment;
determining a first predicted value of the time-series sequence at the evaluation time based on the set of windows of the time-series sequence;
determining an alert threshold value based on the first predicted value of the time-series sequence;
predicting a second value of the time-series sequence at the evaluation time based on data immediately previous to the evaluation time; and
modifying the alert threshold value based on a combination of the first predicted value of the time-series sequence and the second predicted value;
receiving subject event data of the time-series sequence corresponding to the evaluation time;
comparing, by the event analysis system, the subject event data to the alert threshold value; and
identifying an alert level when the subject event data exceeds the alert threshold value.

2. The method of claim 1, wherein the evaluation time is the time at which the event data is received from a monitored system that generates the subject event data.

3. The method of claim 1, wherein the time-series sequence of event data includes event data received from a plurality of monitored systems that generate events.

4. The method of claim 1, wherein the seasonal adjustment is one week.

5. The method of claim 1, wherein modifying the alert threshold value comprises multiplying the second predicted value by a scalar; and adding the scalar-multiplied second predicted value to the alert threshold value.

6. The method of claim 5, further comprising:
determining a second alert threshold value by subtracting the scalar-multiplied second predicted value from the first predicted value of the time-series sequence;
comparing the subject event data to the second alert threshold value; and
identifying a second alert level when the subject event data is below the second alert threshold value.

7. The method of claim 1, wherein the time-series sequence of event data comprises a set of data tiles aggregating the event data received at an update frequency, each data tile in the set of data tiles including a plurality of periods of the update frequency.

8. The method of claim 7, wherein each window of the set of windows includes a portion of the set of data tiles, and further wherein predicting the value of the time-series sequence at the evaluation time is based on summary statistics of the portion of the set of data tiles for each window.

9. The method of claim 1, further comprising:
predicting a third value of the time-series sequence at the evaluation time based on a set of recent data immediately previous to the evaluation time based on a gradient of the recent data; and
modifying the alert threshold value based on the third predicted value.

10. A non-transitory computer-readable storage medium storing computer program instructions executable by a processor to perform operations, the operations comprising:
identifying a time-series sequence of event data for a type of event;
identifying an evaluation time at which to determine an outlier in the time-series sequence;
identifying a seasonal adjustment for the event data;
selecting a set of windows of the time-series sequence, each window in the set of windows identifying a portion of time including the evaluation time as adjusted by the seasonal adjustment;
determining a first predicted value of the time-series sequence at the evaluation time based on the set of windows of the time-series sequence;
determining an alert threshold value based on the first predicted value of the time-series sequence;
predicting a second value of the time-series sequence at the evaluation time based on data immediately previous to the evaluation time; and
modifying the alert threshold value based on a combination of the first predicted value of the time-series sequence and the second predicted value;
receiving subject event data of the time-series sequence corresponding to the evaluation time;
comparing, by the event analysis system, the subject event data to the alert threshold value; and
identifying an alert level when the subject event data exceeds the alert threshold value.

11. The non-transitory computer-readable storage medium of claim 10, wherein the evaluation time is the time at which the event data is received from a monitored system that generates the subject event data.

12. The non-transitory computer-readable storage medium of claim 10, wherein the time-series sequence of event data includes event data received from a plurality of monitored systems that generate events.

13. The non-transitory computer-readable storage medium of claim 10, wherein the seasonal adjustment is one week.

14. The non-transitory computer-readable storage medium of claim 10, wherein modifying the alert threshold value comprises multiplying the second predicted value by a scalar; and adding the scalar-multiplied second predicted value to the alert threshold value.

15. The non-transitory computer-readable storage medium of claim 14, the operations further comprising:
determining a second alert threshold value by subtracting the scalar-multiplied second predicted value from the first predicted value of the time-series sequence;
comparing the subject event data to the second alert threshold value; and
identifying a second alert level when the subject event data is below the second alert threshold value.

16. The non-transitory computer-readable storage medium of claim 10, wherein the time-series sequence of event data comprises a set of data tiles aggregating the event data received at an update frequency, each data tile in the set of data tiles including a plurality of periods of the update frequency.

17. The non-transitory computer-readable storage medium of claim 16, wherein each window of the set of windows includes a portion of the set of data tiles, and further wherein predicting the value of the time-series sequence at the evaluation time is based on summary statistics of the portion of the set of data tiles for each window.

18. The non-transitory computer-readable storage medium of claim 10, the operations further comprising:
   predicting a third value of the time-series sequence at the evaluation time based on a set of recent data immediately previous to the evaluation time based on a gradient of the recent data; and
   modifying the alert threshold value based on the third predicted value.

19. A system, comprising:
   a processor; and
   a non-transitory computer-readable storage medium storing computer program instructions executable by the processor to perform operations, the operations comprising:
      identifying a time-series sequence of event data for a type of event;
      identifying an evaluation time at which to determine an outlier in the time-series sequence;
      identifying a seasonal adjustment for the event data;
      selecting a set of windows of the time-series sequence, each window in the set of windows identifying a portion of time including the evaluation time as adjusted by the seasonal adjustment;
      determining a first predicted value of the time-series sequence at the evaluation time based on the set of windows of the time-series sequence;
      determining an alert threshold value based on the first predicted value of the time-series sequence;
      predicting a second value of the time-series sequence at the evaluation time based on data immediately previous to the evaluation time; and
      modifying the alert threshold value based on a combination of the first predicted value of the time-series sequence and the second predicted value;
      receiving subject event data of the time-series sequence corresponding to the evaluation time;
      comparing, by the event analysis system, the subject event data to the alert threshold value; and
      identifying an alert level when the subject event data exceeds the alert threshold value.

20. The system of claim 19, wherein the evaluation time is the time at which the event data is received from a monitored system that generates the subject event data.

* * * * *